United States Patent Office 3,022,314
Patented Feb. 20, 1962

3,022,314
ALPHA-PHENYL-OMEGA-AMINO-ALKANAMIDES
Brooke D. Aspergren and Robert Bruce Moffett, Kalamazoo, and Merrill E. Speeter, Kalamazoo Township, Kalamazoo County, Mich., assignors to The Upjohn Company, Kalamazoo, Mich., a corporation of Michigan
No Drawing. Filed June 20, 1955, Ser. No. 516,764
12 Claims. (Cl. 260—326.3)

This invention relates to new compounds and is particularly directed to new N-mono-substituted α-(tertiary-aminoalkyl)-α-phenylacetamides.

The novel compounds according to the invention can, for the most part, be represented by the following basic general formula:

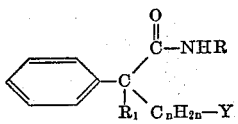

wherein $C_nH_{2n}$ is an alkylene group containing not more than 6 carbon atoms, Y is a tertiaryamino radical, R is a lower hydrocarbon radical, and $R_1$ is hydrogen or a lower hydrocarbon radical, and can exist in the form of the free base or a coordination complex or addition compound thereof such as acid addition salts, quaternary ammonium compounds, amine oxides, and amine oxide-acid addition salts. The term "lower" is used to designate not more than 8 carbon atoms. The hydrocarbon radicals can be substituted by indifferent substituents such as chlorine, bromine, iodine, nitro, hydroxy, lower alkoxy, lower tertiaryamino, and the like.

A large number of α-(tertiaryaminoalkyl)-α-phenyl-acetamides are known in the art to have pharmaceutical and pharmacological activity. Bockmühl et al., German Patent 731,561; Bockmühl et al., Ann. 561, 52 (1948); Cheney et al., J. Org. Chem. 17, 771 (1952); Wheatley et al., J. Org. Chem. 19, 794 (1954); Speeter U.S. Patent 2,647,926 and German patent application B12,358 12q 6/02 opened for inspection December 17, 1952. These unsubstituted amides, i.e., primary amides, are particularly noteworthy for their anticholinergic properties. 4-dimethylamino-2,2-diphenylvaleramide, for example, has unusually good anti-spasmodic and antisecretory activity. 2,2-dimethyl-α,α-diphenyl-1-pyrrolidinebutyramide is also outstandingly active as an antisecretory agent. These N-unsubstituted amides also have oxytocic and diuretic activity although these properties do not seem to have been noted heretofore.

It has now been found in accordance with this invention that if one of the N-hydrogen atoms of these prior art amides is substituted by a lower hydrocarbyl group, new compounds having entirely different and unexpected combination of properties are obtained. These new compounds according to the invention are characterized by good oxytocic and diuretic activity, coupled with the lack of significant anticholinergic activity, and are therefore indicated for use as a uterine stimulant (oxytocic) or as a diuretic where side-effects due to anticholinergic activity are undesired. Moreover, compounds according to the invention in which the N-substituent is an unsubstituted lower aliphatic hydrocarbyl radical have superior oxytocic and diuretic properties, and more particularly so in the 4-tertiaryamino-2,2-diphenylvaleramide series.

The novel compounds of the invention can be prepared by the following processes:

PROCESS A

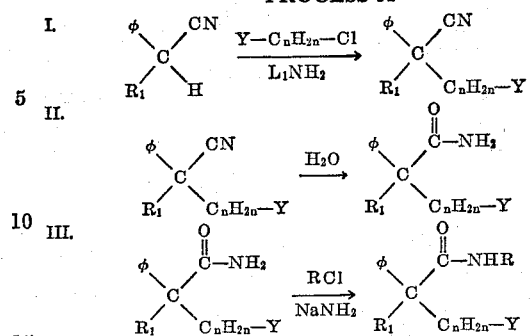

Steps I and II of the above sequence can be carried out in ways shown in the Bockmühl, Cheney, Wheatley, and Speeter references cited above. Additional nitriles that can be used as the starting compounds in Step II are shown in Clarke et al., J. Am. Chem. Soc. 71, 2821-5 (1949). Step III advantageously is carried out in an inert diluent or solvent such as benzene, toluene, xylene, aliphatic hydrocarbon solvents, halogenated hydrocarbon solvents, di-lower-alkyl ethers and the like. The temperature may range up to about 150 degrees centigrade. Ordinarily the reflux temperature can be used. In place of the sodium amide, lithium amide, sodium hydride, sodium ethoxide, and like alkali metal alkoxides, or metallic sodium can be used. The bromide or iodide can be used in place of chlorides.

PROCESS B

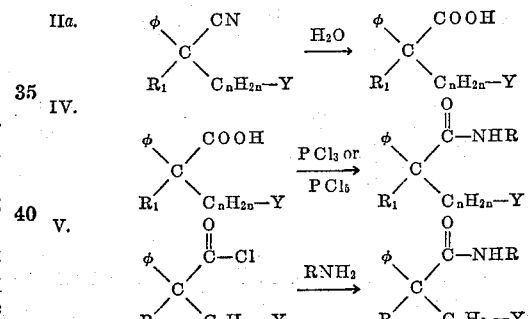

Steps IIa and IV can be carried out as shown in the Bockmühl and Clarke citations, supra. Step V is advantageously carried out in an inert diluent or solvent such as those listed above. The amine is added slowly to the reaction mixture with cooling, as on an ice bath, if necessary followed by gentle heating as on a steam bath. Thionyl chloride can be used in place of the phosphorus chlorides where the $C_nH_{2n}$ group is not ethylene or

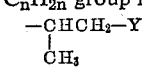

The starting compounds for steps II and IIa can also be prepared as follows:

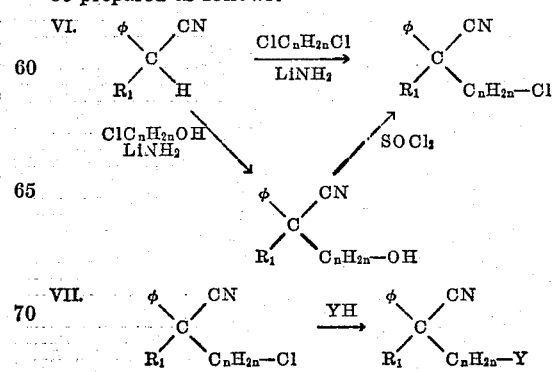

Steps VI and VII can be carried out by the procedures given in the references cited above, particularly in the Cheney, Wheatley, and Clarke references. By suitable selection of alkylene dihalides, halohydrins, and secondary amines, it is possible easily to obtain any of the starting compounds required to prepare the compounds of the invention.

As shown by the prior art cited above and the examples hereinafter given, $R_1$ can be hydrogen or a lower hydrocarbyl radical as defined above, including such radicals as lower alkyl, lower alkenyl, lower cycloaliphatic, lower aralkyl, lower aryl, and the like. R also can be a hydrocarbyl radical as thus exemplified. The alkylene group, $C_nH_{2n}$, can be a straight chain (polymethylene) alkylene or a branched chain alkylene group containing up to and including six carbon atoms such as ethylene, propylene, butylene, amylene, and hexylene including the isomeric forms thereof.

Examples of lower alkyl groups are methyl, ethyl, propyl, butyl, hexyl, octyl, and the like, including isomeric forms thereof. Examples of lower alkenyl groups are allyl, 1-propenyl, the various butenyls, hexenyls, octenyls, and the like, including isomeric forms thereof. Examples of lower cycloaliphatic groups are cyclopropyl, cyclobutyl, cyclopentyl, methylcyclopentyl, cyclohexyl, dimethylcyclohexyl, cyclohexenyl, and the like, including isomeric forms thereof. Examples of lower aralkyl groups are benzyl, methylbenzyl, phenethyl, and the like, including isomeric forms thereof. Examples of lower aryl groups are phenyl, tolyl, xylyl, chlorophenyl, dichlorophenyl, chlorotolyl, and the like, including isomeric forms thereof. Examples of tertiary amino radicals are di-lower-alkylamino radicals in which the alkyl radicals can be the same or different and can be methyl, ethyl, propyl, butyl, hexyl, octyl, and the like, including the isomeric forms thereof, and di-lower-alkylamino radicals in which the alkyl groups are linked together in a saturated heterocyclic group such as pyrrolidino, morpholino, and piperidino radicals and the homologues thereof such as 2-methylmorpholino, 2,2-dimethylpyrrolidino, 4-methylpiperidino, and the like.

As noted above the compounds of the invention are characteristically differentiated from the corresponding N-unsubstituted amides by lack of significant anticholinergic activity, while retaining or even surpassing the oxytocic and diuretic activity of the unsubstituted amides. The compounds of the invention therefore are particularly useful for uterine stimulation and for diuresis in situations where anticholinergic side-effects are undesirable. For such purposes the free bases of the invention are most advantageously administered in the form of their acid addition salts with pharmacologically acceptable acids such as hydrochloric, hydrobromic, sulfuric, phosphoric, lactic, citric, tartaric, benzoic, salicylic, succinic and acetic acids.

The data given in the following table is illustrative of the differentiating effects noted above. The antispasmodic index was determined by intravenous administration to Thiry-Vella dogs and equated to atropine equals 1.0 (low values mean low activity). The antisecretory activity was determined intravenously in rats and is given as the $ED_{50}$ in mg./kg.—the effective dose necessary to reduce gastric secretion by fifty percent (low values mean high activity). Oxytocic (uterine) activity was determined intravenously in cats at doses ranging from 0.25 to two mg./kg. and rated in the following order of stimulation: Good, Pronounced, Fair, Slight, Nil, and Minus (relaxation). The diuretic activity was determined orally in rats at doses of 5, 10, and 20 mg./kg. and rated in the following order: Excellent, Good, Fair, Mild, Slight, and Nil.

*Pharmacological activity of compounds having the following basic general formula*

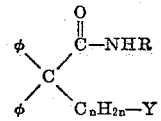

GROUP I.—Y—$C_nH_{2n}$—=Y—CH(CH$_3$)CH$_2$—

| Compound | Anti-spasmodic index | Anti-secretory activity | Uterine activity | | Diuretic activity | |
|---|---|---|---|---|---|---|
| | | | Rating | Dose, mg./kg. | Rating | Dose, mg./kg. |
| Prior art type: R=H, Y=dimethylamino, Sulfate | 1.0 | 0.5 | F | 0.5 | M | 10 |
| Example 3: R=CH$_3$, Y=dimethylamino, HCl | <0.1 | >1.0 | G | 0.25 | E | 5 |
| Example 4: R=CH$_2$CH$_3$, Y=dimethylamino, HCl | <0.1 | >1.0 | P | 1.0 | E | 5 |
| Example 1: R=CH(CH$_3$)$_2$, Y=dimethylamino, HCl | <0.1 | 1.0 | G | 0.25 | E | 5 |
| Example 5: R=CH$_2$CH=CH$_2$, Y=dimethylamino, HCl | <0.1 | >1.0 | P | 1.0 | G | 20 |
| Example 2: R=C$_6$H$_{11}$, Y=dimethylamino, HCl | <0.1 | >1.0 | G | 0.5 | F | 10 |
| Example 14: R=C$_6$H$_5$, Y=dimethylamino, HCl | <0.1 | >1.0 | N | 1.0 | Sl | 10 |
| Example 17: R=CH$_2$CH$_2$OH, Y=dimethylamino, HCl | <0.1 | ---- | Sl | 1.0 | E | 20 |
| Example 18: R=CH$_3$, Y=dimethylamino, Amine oxide | <0.1 | >1.0 | Sl | 8.0 | E | 20 |

GROUP II.—Y—$C_nH_{2n}$=Y—$(CH_2)_n$—

| Compound | Anti-spasmodic index | Anti-secretory activity | Uterine activity | | Diuretic activity | |
|---|---|---|---|---|---|---|
| | | | Rating | Dose, mg./kg. | Rating | Dose, mg./kg. |
| Examples 7 and 13: R=$CH_3$ (n=2) Y=diethylamino (n=3) HCl | <0.1 <0.1 | <1.0 >1.0 | P SI | 1.0 1.0 | E N | 20 20 |
| Example 10: R=$CH_3$ Y=diisopropylamino n=2 HCl | <0.1 | | P | 2.0 | E | 10 |
| Example 11: R=$CH_3$ Y=2-methylpyrrolidino n=2 HCl | <0.1 | >1.0 | M | 1.0 | F | 20 |
| Prior art type: R=H Y=Methylpyrrolidino n=2 HCl | 0.2 | 0.2 | SI | 1.0 | N | 20 |
| Example 8: R=$CH_3$ Y=2,2-dimethylpyrrolidino n=2 HCl | <0.1 | >1.0 | SI | 1.0 | E | 20 |
| Prior art type: R=H Y=2,2-dimethylpyrrolidino n=2 Sulfate | 0.1 | 0.5 | G | 1.0 | | |
| Example 9: R=$CH_3$ Y=pyrrolidino n=3 Methobromide | <0.1 | >1.0 | P | 2.0 | N | 20 |
| Prior art type: R=H Y=Pyrrolidino n=2 Methobromide | 1.0 | 0.2 | M | 2.0 | | |

From these data it can be seen that there is a marked difference in the anticholinergic activity (antispasmodic and antisecretory activity) of the N-unsubstituted amides of the prior art and the N-mono-substituted amides of the invention. These data also show the high oxytocic activity of the compounds of the invention in which the N-substituent is an unsubstituted aliphatic lower hydrocarbyl radical, especially in the compounds of group I.

The invention may now be more fully understood by referring to the following examples which are illustrative of the novel compounds of the invention and their preparation, but are not to be construed as limiting.

EXAMPLE 1

*Preparation of 4-dimethylamino-N-isopropyl-2,2-diphenylvaleramide and salts thereof*

A. ACID SULFATE OF 4-DIMETHYLAMINO-2,2-DIPHENYLVALERIC ACID

A solution of 600 milliliters of concentrated sulfuric acid and 350 milliliters of water was cooled in an ice bath and then gradually added, with stirring, to a three-liter flask containing 500 grams (1.8 moles) of 4-dimethylamino-2,2-diphenylvaleronitrile (Cheney et al., supra). The reaction mixture was stirred and heated at 150 degrees centigrade for five hours, allowed to stand overnight, and filtered through a sintered-glass funnel. The resulting crude, solid product was washed with cold absolute ethyl alcohol and recrystallized from three liters of methyl alcohol. There was thus obtained 627 grams (88 percent yield) of the acid sulfate of 4-dimethylamino-2,2-diphenylvaleric acid, melting point 220–222 degrees centigrade.

B. ACID SULFATE OF 4-DIMETHYLAMINO-2,2-DIPHENYLVALERYL CHLORIDE

Thionyl chloride (525 milliliters) was rapidly added with stirring to 350 grams (0.885 mole) of the acid sulfate of 4-dimethylamino-2,2-diphenylvaleric acid (Part A, this example). The reaction mixture was stirred for 1.5 hours at room temperature and then for one hour on a steam bath. Excess thionyl chloride was removed by distillation under reduced pressure at fifty degrees centigrade until the mixture solidified. Then 500 milliliters of benzene was added, and about one-half of it was removed by distillation under reduced pressure. The resulting slurry was filtered; the recovered solid was washed successively with benzene and ether, and dried in a vacuum desiccator over calcium chloride. There was thus obtained in crystalline condition 355 grams (97 percent yield) of the acid sulfate of 4-dimethylamino-2,2-diphenylvaleryl chloride.

C. 4-DIMETHYLAMINO-N-ISOPROPYL-2,2-DIPHENYLVALERAMIDE FREE BASE

To a mixture of 400 milliliters of benzene and 207 grams (0.5 mole) of the acid sulfate of 4-dimethylamino-2,2-diphenylvaleryl chloride (Part B, this example), cooled with an ice bath, there was gradually added 177.6 grams (three moles) of isopropylamine. The mixture was heated for one hour on a steam bath, and filtered to remove solid material. The filtrate was dried with anhydrous sodium sulfate and benzene was removed by distillation. The residual oil soon solidified and this solid was recrystallized from 200 milliliters of cyclohexane. The recrystallized material was shaken with a solution of 100 milliliters of concentrated hydrochloric acid and 500 milliliters of water. The mixture was filtered to remove insoluble material; the latter was washed with water. The combined acid solution and water washings were made alkaline, whereupon a rather oily solid formed. The solid was extracted into benzene, and the benzene solution was dried over anhydrous sodium sulfate and evaporated to dryness. The solid residue was recrystallized from 200 milliliters of cyclohexane to provide 80.3 grams (47.5 percent yield) of 4-dimethylamino-N-isopropyl-2,2-diphenylvaleramide, having a melting point of 115–117 degrees centigrade and the following analysis.

*Anal.*—Calcd. for $C_{22}H_{30}N_2O$: C, 78.06; H, 8.93; N, 8.28. Found: C, 78.16; H, 8.89; N, 8.29.

D. 4-DIMETHYLAMINO-N-ISOPROPYL-2,2-DIPHENYLVALERAMIDE HYDROCHLORIDE

To a solution of 4-dimethylamino-N-isopropyl-2,2-diphenylvaleramide (Part C, this example) in methyl ethyl ketone was added a solution of hydrogen chloride in ethyl alcohol. The 4-dimethylamino-N-isopropyl-2,2-diphenylvaleramide hydrochloride thus obtained had a melting point of 216–218 degrees centigrade and the following analysis.

*Anal.*—Calcd. for $C_{22}H_{31}ClN_2O$: C, 70.47; H, 8.33; Cl, 9.46; N, 7.47. Found: C, 70.22; H, 8.37; Cl, 9.50; N, 7.73.

E. 4-DIMETHYLAMINO-N-ISOPROPYL-2,2-DIPHENYL-VALERAMIDE METHOBROMIDE

An excess of cold methyl bromide was added to a flask containing a cold solution of 46 grams of 4-dimethylamino-N-isopropyl-2,2-diphenylvaleramide (Part C, this example) in 100 milliliters of benzene. The flask was tightly closed and allowed to stand at room temperature for six days. Ether was added to the solution to crystallize 4-dimethylamino-N-isopropyl-2,2-diphenylvaleramide methodbromide which, after recrystallization from an ether-ethyl acetate mixture, had a melting point of 155–158 degrees centigrade and the following analysis.

*Anal.*—Calcd. for $C_{23}H_{33}BrN_2O$: C, 63.73; H, 7.67; Br, 18.44; N, 6.46. Found: C, 64.09; H, 7.71; Br, 18.27; N, 6.36.

EXAMPLE 2

*Preparation of N-cyclohexyl-4-dimethylamino,2,2-diphenylvaleramide and salts thereof*

A. N-CYCLOHEXYL-4-DIMETHYLAMINO-2,2-DIPHENYL-VALERAMIDE FREE BASE

A total of 45.5 grams (0.11 mole) of the acid sulfate of 4-dimethylamino-2,2-diphenylvaleryl chloride (Example 1, Part B) was added in small portions to a solution of 54.5 grams (0.55 mole) of cyclohexylamine in 150 milliliters of dry benzene. During this addition and for five hours thereafter the reaction mixture was cooled with an ice bath and stirred. The mixture was brought to room temperature and filtered, and the filtrate was extracted with several portions of dilute hydrochloric acid. The combined aqueous acid extracts were made alkaline and the mixture was extracted with benzene. The benzene solution was dried and evaporated under reduced pressure. The residual solid was recrystallized from fifty percent aqueous isopropyl alcohol, N-cyclohexyl-4-dimethylamino-2,2-diphenylvaleramide, melting point 80–90 degrees centigrade, being thus obtained. A sample of this product, after being dried under reduced pressure at 78 degrees centigrade, had a melting point of 94–97 degrees centigrade and the following analysis.

*Anal.*—Calcd. for $C_{25}H_{34}N_2O$: C, 79.32; H, 9.05; N, 7.40. Found: C, 79.66; H, 8.91; N, 7.48.

B. N-CYCLOHEXYL-4-DIMETHYLAMINO-2,2-DIPHENYL-VALERAMIDE HYDROCHLORIDE

A solution of one gram of hydrogen chloride in 3.8 milliliters of ethyl alcohol was added to an ethyl acetate solution of four grams (0.011 mole) of N-cyclohexyl-4-dimethylamino-2,2-diphenylvaleramide (Part A, this example). Addition of ether precipitated N-cyclohexyl-4-dimethylamino-2,2-diphenylvaleramide hydrochloride as a gummy solid. Recrystallization from ethyl acetate yielded the hydrochloride as a crystalline product having a melting point of 189–191 degrees centigrade and the following analysis.

*Anal.*—Calcd. for $C_{25}H_{35}ClN_2O$: C, 72.35; H, 8.50; Cl, 8.54; N, 6.75. Found: C, 72.07; H, 8.64; Cl, 8.40; N, 6.22.

C. N-CYCLOHEXYL-4-DIMETHYLAMINO-2,2-DIPHENYL-VALERAMIDE METHOBROMIDE

By substituting N-cyclohexyl-4-dimethylamino-2,2-diphenylvaleramide (Part A, this example) as the starting tertiary amine in the procedure of Example 1, Part E, there was obtained N-cyclohexyl-4-dimethylamino-2,2-diphenylvaleramide methobromide. This product melted between 130 and 135 degrees centigrade and the following analysis.

*Anal.*—Calcd. for $C_{26}H_{37}BrN_2O$: C, 65.95; H, 7.88; Br, 16.88; N, 5.92. Found: C, 66.55; H, 7.98; Br, 16.38; N, 5.67.

EXAMPLE 3

*Preparation of 4-dimethylamino-N-methyl-2,2-diphenylvaleramide and salts thereof*

A. 4-DIMETHYLAMINO-N-METHYL-2,2-DIPHENYLVALER-AMIDE FREE BASE

To a benzene slurry of the acid sulfate of 4-dimethylamino-2,2-diphenylvaleryl chloride (Example 1, Part B) cooled in an ice bath was slowly added, with stirring, sufficient of a benzene solution of methylamine to provide an excess of the latter. The reaction mixture was heated under reflux for one hour, after which water and dilute hydrochloric acid were added. The aqueous phase was separated, washed with benzene, and made alkaline with caustic soda. 4-dimethylamino - N-methyl-2,2-diphenylvaleramide separated as a solid. After recrystallization from isopropyl alcohol, the product had a melting point of 168–169 degrees centigrade and the following analysis.

*Anal.*—Calcd. for $C_{20}H_{26}N_2O$: C, 77.38; H, 8.44; N, 9.03. Found: C, 77.71; H, 8.46; N, 9.22.

B. 4-DIMETHYLAMINO-N-METHYL-2,2-DIPHENYLVALER-AMIDE HYDROCHLORIDE 4-dimethylamino-N-methyl-2,2-diphenylvaleramide hydrochloride, prepared by adding a slight excess of a solution of hydrogen chloride in ethyl alcohol to a solution of 4-dimethylamino-N-methyl-2,2-diphenylvaleramide (Part A, this example) in ethyl acetate, had a melting point of 219–221 degrees centigrade and the following analysis.

*Anal.*—Calcd. for $C_{20}H_{27}ClN_2$: C, 69.24; H, 7.84; Cl, 10.22; N, 8.08. Found: C, 69.17; H, 7.58; Cl, 10.10; N, 8.31.

C. 4-DIMETHYLAMINO-N-METHYL-2,2-DIPHENYLVALER-AMIDE METHOBROMIDE

The procedure of Example 1, Part E, was employed to react forty grams of methyl bromide with ten grams of 4-dimethylamino-N-methyl-2,2-diphenylvaleramide (Part A, this example) dissolved in 100 milliliters of benzene. The product, 4-dimethylamino-N-methyl-2,2-diphenylvaleramide, had a melting point of 190–192 degrees centigrade and the following analysis.

*Anal.*—Calcd. for $C_{21}H_{29}BrN_2O$: C, 62.22; H, 7.21; Br, 19.71; N, 6.91. Found: C, 62.16; H, 7.03; Br, 19.65; N, 6.90.

EXAMPLE 4

*Preparation of 4-dimethylamino-N-ethyl-2,2-diphenylvaleramide and salts thereof*

A. 4-DIMETHYLAMINO-N-ETHYL-2,2-DIPHENYLVALER-AMIDE FREE BASE

A solution of 45 grams (one mole) of ethylamine in 200 milliliters of benzene was gradually added, with stirring, to a slurry of 82.8 grams (0.2 mole) of the acid sulfate of 4 - dimethylamino-2,2-diphenylvaleryl chloride (Example 1, Part B) in 100 milliliters of benzene. The reaction mixture was heated under reflux for one hour. A solution of 100 milliliters of concentrated hydrochloride acid and 200 milliliters of water was added with agitation, the aqueous phase was separated, and 400 milliliters of twenty percent sodium hydroxide solution was added thereto. The resulting solid precipitate was recrystallized from isopropyl alcohol. There was thus obtained an 84 percent yield of 4-dimethylamino-N-ethyl-2,2-diphenylvaleramide having a melting point of 133–135 degrees centigrade and the following analysis.

*Analysis.*—Calcd. for $C_{21}H_{28}N_2O$: C, 77.73; H, 8.70; N, 8.64. Found: C, 78.01; H, 8.40; N, 8.42.

B. 4-DIMETHYLAMINO-N-ETHYL-2,2-DIPHENYLVALER-AMIDE HYDROCHLORIDE

A slight excess of an ethyl alcohol solution of hydrogen chloride was added to a solution of 16.2 grams (0.05 mole) of 4-dimethylamino-N-ethyl - 2,2 - diphenylvaleramide (Part A, this example) in ethyl acetate. There was thus obtained an 86 percent yield of 4-dimethylamino-N-ethyl - 2,2 - diphenylvaleramide hydrochloride having a melting point of 197–199 degrees centigrade and the following analysis.

*Analysis.*—Calcd. for $C_{21}H_{29}ClN_2O$: C, 69.88; H, 8.10; Cl, 9.82; N, 7.76. Found: C, 69.69; H, 7.83; Cl, 9.66; N, 7.63.

C. 4-DIMETHYLAMINO-N-ETHYL-2,2-DIPHENYLVALER-AMIDE METHOBROMIDE

Starting with fifty grams of methyl bromide and a solution of 16.2 grams (0.05 mole) of 4-dimethylamino-N-ethyl-2,2-diphenylvaleramide (Part A, this example) in 100 milliliters of benzene, and following the procedure set forth in Example 1, Part E, a 98 percent yield of 4-dimethylamino-N-ethyl-2,2-diphenylvaleramide methobromide was obtained. This compound, after recrystallization from isopropyl alcohol, had a melting point of 176–178 degrees centigrade and the following analysis.

*Analysis.*—Calcd. for $C_{22}H_{31}BrN_2O$: C, 63.00; H, 7.45; Br, 19.06; N, 6.68. Found: C, 62.86; H, 7.16; Br, 18.83; N, 6.78.

EXAMPLE 5

*Preparation of N-allyl-4-dimethylamino-2,2-diphenylvaleramide and salts thereof*

A. N-ALLYL-4-DIMETHYLAMINO-2,2-DIPHENYLVALER-AMIDE FREE BASE

Allylamine (57.1 grams, one mole) was slowly added to a stirred slurry of 82.8 grams (0.2 mole) of the acid sulfate of 4-dimethylamino-2,2-diphenylvaleryl chloride (Example 1, Part B) in 100 milliliters of benzene, and the reaction mixture was heated under reflux for one hour. The work-up procedure was essentially the same as described in Example 4, Part A. There was thus obtained crude N - allyl-4-dimethylamino-2,2-diphenylvaleramide, which on recrystallization from isopropyl alcohol gave 56.8 grams (84.4 percent yield) of pure product having a melting point of 99–101 degrees centigrade and the following analysis.

*Analysis.*—Calcd. for $C_{22}H_{28}N_2O$: C, 78.53; H, 8.39; N, 8.33. Found: C, 78.78; H, 8.32; N, 8.59.

B. N-ALLYL-4-DIMETHYLAMINO-2,2-DIPHENYLVALER-AMIDE HYDROCHLORIDE

To a solution of 16.8 grams (0.05 mole) of N-allyl-4-dimethylamino - 2,2 - diphenylvaleramide (Part A, this example) in 100 milliliters of ethyl acetate was added the theoretical amount of a solution of hydrogen chloride in ethyl alcohol. The reaction mixture was allowed to stand in a refrigerator, whereupon the desired product, N - allyl-4-dimethylamino-2,2-diphenylvaleramide hydrochloride, crystallized. After recovery by filtration, washing with benzene, and drying this product weighed 13.5 grams (72 percent yield) and had a melting point of 167–170 degrees centigrade and the following analysis.

*Analysis.*—Calcd. for $C_{22}H_{29}ClN_2O$: C, 70.85; H, 7.84; Cl, 9.51; N, 7.51. Found: C, 70.55; H, 7.59; Cl, 9.53; N, 7.25.

C. N-ALLYL-4-DIMETHYLAMINO-2,2-DIPHENYLVALER-AMIDE METHOBROMIDE

Starting with fifty grams of methyl bromide and 16.8 grams (0.05 mole) of N-allyl - 4 - dimethylamino-2,2-diphenylvaleramide (Part A, this example) and following the same procedure disclosed in Example 1, Part E, N-allyl-4-dimethylamino - 2,2 - diphenylvaleramide methobromide was obtained. Recrystallization from isopropyl alcohol gave a 98 percent yield of purified product having a melting point of 167–169 degrees centigrade and the following analysis.

*Analysis.*—Calcd. for $C_{23}H_{31}BrN_2O$: C, 64.03; H, 7.24; Br, 18.53; N, 6.50. Found: C, 63.94; H, 7.18; Br, 18.76; N, 6.29.

EXAMPLE 6

*Preparation of N-n-butyl-4-dimethylamino-2,2-diphenylvaleramide and methobromide thereof*

Seventy grams of N-n-butyl - 4 - dimethylamino-2,2-diphenylvaleramide (free base) was obtained as a thick oil by following the procedure of Example 5, Part A, except for the substitution of one mole of n-butylamine for allylamine.

Fifty grams of methyl bromide was added to a solution of 17.5 grams (0.5 mole) of N-n-butyl-4-dimethylamino-2,2-diphenylvaleramide in 100 milliliters of benzene. After one week ether was added, a gum being precipitated. Crystallization was induced by dropwise addition of ether to a boiling ethyl acetate solution of the gum. The N-n-butyl-4-dimethylamino-2,2-diphenylvaleramide methobromide thus obtained, after being recovered and dried, weighed seventeen grams (77.5 percent yield), melted 175–177 degrees centigrade, and had the following analysis.

*Analysis.*—Calcd. for $C_{24}H_{35}BrN_2O$: C, 64.42; H, 7.88; Br, 17.86; N, 6.28. Found: C, 64.61; H, 7.73; Br, 17.89; N, 6.25.

EXAMPLE 7

*Preparation of 4-diethylamino-N-methyl-2,2-diphenylbutyramide and salts thereof*

A. 4-DIETHYLAMINO-N-METHYL-2,2-DIPHENYLBUTYR-AMIDE FREE BASE 4-diethylamino-2,2-diphenylbutyramide (Cheney et al., supra) (63.5 grams, 0.205 mole) was added with stirring to a slurry of eight grams (0.205 mole) of sodium amide and 500 milliliters of dry toluene. After the mixture had been heated under reflux for 2.5 hours, a solution of 19.5 grams (0.205 mole) of methyl bromide in 100 milliliters of toluene was gradually added, and stirring was continued for one hour without the application of heat. Water was added to the reaction mixture, and the organic layer after being separated was extracted with 200 milliliters of five percent hydrochloric acid. This extract was made alkaline with 100 milliliters of twenty percent aqueous sodium hydroxide solution and then extracted with benzene. The benzene extract was dried with anhydrous sodium sulfate and the benzene was removed by distillation under reduced pressure. There was thus obtained 4-diethylamino - N - methyl-2,2-diphenylbutyramide as a clear yellow oil.

B. 4-DIETHYLAMINO-N-METHYL-2,2-DIPHENYLBUTYR-AMIDE HYDROCHLORIDE

Upon adding a slight excess of a solution of hydrogen chloride in ethyl alcohol to a solution of 4-diethylamino-N-methyl-2,2-diphenylbutyramide (Part A, this example) in methyl ethyl ketone, 4-diethylamino-N-methyl-2,2-diphenylbutyramide hydrochloride precipitated as a white solid having a melting point of 175–185 degrees centigrade. This salt was purified by successive recrystallizations from isopropyl alcohol, methyl ethyl ketone-ethyl alcohol mixture, isopropyl alcohol, and ethyl alcohol, after which the melting point was 185–187 degrees centigrade. Analysis:

*Anal.*—Calcd. for $C_{21}H_{29}ClN_2O$: C, 69.88; H, 8.10; Cl, 9.82; N, 7.76. Found: C, 69.72; H. 7.81; Cl, 9.81; N, 7.61.

C. 4-DIETHYLAMINO-N-METHYL-2,2-DIPHENYLBUTYR-AMIDE METHOBROMIDE

Five grams (0.0124 mole) of 4-diethylamino-N-methyl-2,2-diphenylbutyramide hydrochloride (Part B, this example) was shaken with 25 milliliters of twenty percent aqueous sodium hydroxide solution and fifty milliliters of benzene. The benzene phase was separated, dried with anhydrous sodium sulfate, decanted, and mixed with thirty grams of methyl bromide. A powdery solid had separated from the solution after three days standing. By recrystallizing the solid from ethyl acetate-ethyl alcohol mixture, there was obtained 4-diethylamino-N-methyl-2,2-diphenylbutyramide methobromide having a melting point of 216–217 degrees centigrade and the following analysis.

*Anal.*—Calcd. for $C_{22}H_{31}BrN_2O$: C, 63.00; H, 7.45; Br, 19.06; N, 6.68. Found: C, 63.38; H, 7.45; Br, 18.70; N, 6.56.

EXAMPLE 8

*Preparation of N,2,2-trimethyl-α,α-diphenyl-1-pyrrolidinebutyramide and salts thereof*

A. N,2,2-TRIMETHYL-α,α-DIPHENYL-1-PYRROLIDINE-BUTYRAMIDE AND HYDROCHLORIDE THEREOF

To a slurry of 6.5 grams (0.166 mole) of sodium amide and 600 milliliters of toluene was added 53.5 grams (0.159 mole) of 2,2-dimethyl-α,α-dipthenyl-1-pyrrolidinebutyramide. The mixture was heated at reflux temperature for three hours, cooled with an ice bath, and a solution of 15.1 grams (0.159 mole) of methyl bromide in 200 milliliters of toluene was gradually added with stirring. The mixture was allowed to come to room temperature, washed with water, and extracted with dilute hydrochloric acid. The aqueous acid solution, after being washed with ether, was made alkaline with sodium hydroxide and extracted with benzene. The benzene extract was dried with anyhdrous sodium sulfate and evaporated to yield a yellow oil, crude N,2,2-trimethyl-α,α-diphenyl-1-pyrrolidinebutyramide. The crude product was dissolved in pentane and the solution was seeded with a small quantity of the starting N-unsubstituted amide. After unchanged starting amide has precepitated, the pentane solution was decanted and evaporated to give an oil, purified N,2,2-trimethyl-α,α-diphenyl-1-pyrrolidinebutyramide. This free base was dissolved in ethyl acetate and mixed with a slight excess of a solution of hydrogen chloride in ethyl alcohol. Chilling caused precipitation of 44.9 grams of N,2,2-trimethyl-α,α-diphenyl-1-pyrrolidine-butyramide hydrochloride having a melting point of 214–216 degrees centigrade and the following analysis.

*Anal.*—Calcd. for $C_{23}H_{31}ClN_2O$: C, 71.38; H, 8.80; Cl, 9.16; N, 7.24. Found: C, 71.38; H, 8.35; Cl, 9.30; N, 7.13.

B. N,2,2-TRIMETHYL-α,α-DIPHENYL-1-PYRROLIDINE-BUTYRAMIDE METHOBROMIDE

A solution of ten grams of N,2,2-trimethyl-α,α-diphenyl-1-pyrrolidinebutyramide hydrochloride (Part A, this example) in fifty milliliters of water was made alkaline with sodium hydroxide; the mixture was extracted with benzene. The benzene extract was dried with anhydrous sodium sulfate and evaporated to dryness under reduced pressure. The residual oil was dissolved in 100 milliliters of methyl ethyl ketone, the solution was cooled, and forty grams of cold methyl bromide was added. The solution was kept in a stoppered flask for three days at room temperature, after which ether was added. There was thus obtained solid N,2,2-trimethyl-α,α-diphenyl-1-pyrrolidinebutyramide methobromide, which after recrystallization from methyl ethyl ketone weighed 7.4 grams (64 percent yield) and had a melting point of 122–125 degrees centigrade.

C. N,2,2-TRIMETHYL-α,α-DIPHENYL-1-PYRROLIDINE-BUTYRAMIDE METHIODIDE

By substituting methyl iodide for methyl bromide in the procedure of Part B, this example, there was obtained N,2,2 - trimethyl - α,α - diphenyl - 1 - pyrrolidinebutyramide methiodide, melting point 122–125 degrees centigrade.

EXAMPLE 9

*Preparation of N-methyl-α,α-diphenyl-1-pyrrolidinevaleramide and salts thereof*

A. ACID SULFATE OF α,α-DIPHENYL-1-PYRROLIDINE-VALERIC ACID

A mixture of 95 milliliters of aqueous sulfuric acid (seventy percent sulfuric acid by weight) and fifty grams (0.146 mole) of α,α-diphenyl-1-pyrrolidinevaleronitrile hydrochloride was stirred while being maintained at 150 degrees centigrade for five hours. The reaction mixture was poured onto cracked ice, whereupon a solid precipitated. By recrystallizing the solid from methyl alcohol-ether and then from ethyl alcohol-ether, there was obtained an 82 percent yield of the acid sulfate of α,α-diphenyl-1-pyrrolidinevaleric acid having a melting point of 180–185 degrees centigrade and the following analysis.

*Anal.*—Calcd. for $C_{21}H_{27}NO_6S$: C, 59.83; H, 6.45; N, 3.33; S, 7.61. Found: C, 60.16; H, 6.71; N, 3.50; S, 7.52.

B. N-METHYL-α,α-DIPHENYL-1-PYRROLIDINEVALER-AMIDE FREE BASE

Sixty milliliters (0.82 mole) of thionyl chloride was added to a slurry of forty grams (0.095 mole) of the acid sulfate of α,α-diphenyl-1-pyrrolidinevaleric acid (Part A, this example) and 100 milliliters of benzene. The reaction mixture was stirred for two hours at room temperature and one-half hour at fifty degrees centigrade. Benzene and excess thionyl chloride were removed by distillation under reduced pressure at 35 degrees centigrade. The residual acid sulfate of α,α-diphenyl-1-pyrrolidine-valeryl chloride was dissolved in 100 milliliters of benzene, and the solution was cooled in an ice bath while a solution of fourteen grams (0.45 mole) of methylamine in 100 milliliters of benzene was slowly added. The reaction mixture was stirred for one hour and allowed to stand overnight at room temperature. The benzene solution was decanted from a sticky solid and extracted with 200 milliliters of ten percent hydrochloric acid. The acid extract was made alkaline with 200 milliliters of twenty percent sodium hydroxide solution and extracted with benzene. The benzene extra was washed with water, dried with anhydrous sodium sulfate, and the benzene was evaporated under reduced pressure. The residual gum solidified and was recrystallized twice from cyclohexane. There was thus obtained twenty grams (63 percent yield) of N-methyl-α,α-diphenyl-1-pyrrolidinevaleramide having a melting point of 122–124 degrees centigrade and the following analysis.

*Anal.*—Calcd. for $C_{22}H_{28}N_2O$: C, 78.53; H, 8.39; N, 8.33. Found: C, 78.62; H, 8.25; N, 8.51.

C. N-METHYL-α,α-DIPHENYL-1-PYRROLIDINEVALER-AMIDE HYDROCHLORIDE

A slight excess of a solution of hydrogen chloride in ethyl alcohol was added to a solution of ten grams (0.03 mole) of N-methyl-α,α-diphenyl-1-pyrrolidinevaleramide (Part B, this example) in 150 milliliters of methyl ethyl ketone. A 77 percent yield of N-methyl-α,α-diphenyl-1-pyrrolidinevaleramide hydrochloride was obtained; melting point 147–149 degrees centigrade. Analysis:

*Anal.*—Calcd. for $C_{22}H_{29}ClN_2O$: C, 70.85; H, 7.84; Cl, 9.51; N, 7.51. Found: C, 71.02; H, 7.72; Cl, 9.50; N, 7.97.

D. N-METHYL-α,α-DIPHENYL-1-PYRROLIDINEVALER-AMIDE METHOBROMIDE

A reaction mixture consisting of 150 milliliters of methyl ethyl ketone, 7.5 grams (0.022 mole) of N-methyl-α,α-diphenyl-1-pyrrolidinevaleramide (Part B, this example), and forty grams of methyl bromide was allowed to stand in a stoppered flask for 96 hours. There was obtained a 98 percent yield of N-methyl-α,α-diphenyl-1-pyrrolidinevaleramide methobromide having a melting point of 238–240 degrees centigrade and the following analysis.

*Anal.*—Calcd. for $C_{23}H_{31}BrN_2O$: C, 64.03; H, 7.24; Br, 18.53; N, 6.50. Found: C, 64.41; H, 7.12; Br, 18.31; N, 6.55.

EXAMPLE 10

*Preparation of 4-diisopropylamino-N-methyl-2,2-diphenylbutyramide and hydrochloride thereof*

A slurry of 21 grams (0.062 mole) of 4-diisopropylamino-2,2-diphenylbutyramide, 2.6 grams (0.067 mole) of sodium amide, and 200 milliliters of dry toluene was stirred and heated at reflux temperature for two hours. The mixture was cooled with an ice bath, six grams (0.63 mole) of methyl bromide in 100 milliliters of toluene was added dropwise, and the mixture was stirred at room temperature for four hours. The mixture was washed with water and extracted with a solution of ten milliliters of concentrated hydrochloric acid in 100 milliliters of water. The acid extract was made alkaline with fifty milliliters of twenty percent sodium hydroxide solution and extracted with benzene. 4-diisopropylamino-N-methyl-2,2-diphenylbutyramide was obtained as an oil by drying the benzene extract with anhydrous sodium sulfate and evaporating the benzene. A slight excess of an ethyl alcohol solution of hydrogen chloride was added to an ethyl acetate solution of the oily free base. Addition of ether precipitated - 4 - diisopropylamino-N-methyl-2,2-diphenylbutyramide hydrochloride, which after recrystallization from methyl ethyl ketone had a melting point of 202–204 degrees centigrade and the following analysis.

*Anal.*—Calcd. for $C_{23}H_{33}ClN_2O$: C, 71.02; H, 8.55; Cl, 9.12; N, 7.20. Found: C, 70.99; H, 8.24; Cl, 9.00; N, 7.15.

EXAMPLE 11

*Preparation of N,2-dimethyl-α,α-diphenyl-1-pyrrolidonebutyramide and hydrochloride thereof*

A slurry of 10.2 grams (0.031 mole) of 2-methyl-α,α-diphenyl-1-pyrrolidinebutyramide, 1.4 grams (0.036 mole) of sodium amide, and 200 milliliters of dry toluene was stirred and heated at reflux temperature for two hours. After the mixture was cooled with an ice bath, a solution of three grams (0.031 mole) of methyl bromide in 100 milliliters of toluene was gradually added, and the mixture was stirred at room temperature for about 3.5 hours. The reaction mixture was washed with water and extracted with dilute hydrochloric acid, and the acid extract was made alkaline. The resulting oil was extracted into benzene. The benzene solution was dried with anhydrous sodium sulfate and the benzene was removed by distillation under reduced pressure, leaving ten grams (96 percent yield) of oily N,2-dimethyl-α,α-diphenyl-1-pyrrolidinebutyramide free base. This was dissolved in ethyl acetate and a slight excess of a hydrogen chloride-ethyl alcohol solution was added. Addition of ether precipitated N,2-dimethyl-α,α-diphenyl - 1 - pyrrolidinebutyramide hydrochloride, which after recrystallization from methyl ethyl ketone containing a small amount of ethyl alcohol had a melting point of 195–198 degrees centigrade and the following analysis.

*Anal.*—Calcd. for $C_{22}H_{29}ClN_2O$: C, 70.85; H, 7.84; Cl, 9.51; N, 7.51. Found: C, 70.70; H, 7.61; Cl, 9.61; N, 7.49.

EXAMPLE 12

*Preparation of 4-dimethylamino-N,3-dimethyl-2,2-di-phenylbutyramide and hydrochloride thereof*

A slurry of 42.8 grams (0.144 mole) of 4-dimethylamino-3-methyl - 2,2 - diphenylbutyramide (Cheney et al., supra), 6.2 grams (0.159 mole) of sodium amide, and 250 milliliters of dry toluene was stirred and heated under reflux for two hours. The reaction mixture, after cooling with an ice bath and addition of 13.7 grams (0.144 mole) of methyl bromide in 100 milliliters of toluene, was stirred at room temperature for three hours. It was then washed with water and extracted with a solution of 35 milliliters of concentrated hydrochloric acid in 200 milliliters of water. To the acid extract was added 200 milliliters of 20 percent sodium hydroxide solution, and the precipitated gummy product was extracted with benzene. By drying the extract with anhydrous sodium sulfate and evaporating the benzene, 4-dimethylamino-N,3-dimethyl-2,2-diphenylbutyramide free base was obtained as a viscous oil. This oil was dissolved in ethyl acetate and a slight excess of a solution of hydrogen chloride in ethyl alcohol was added. Upon allowing the mixture to stand overnight in a refrigerator, there were obtained fine white crystals which were recrystallized from ethyl alcohol-ethyl acetate mixture. There was thus obtained thirty grams of 4-dimethylamino-N,3-dimethyl-2,2-diphenylbutyramide hydrochloride having a melting point of 248–250 degrees centigrade and the following analysis.

*Anal.*—Calcd. for $C_{20}H_{27}ClN_2O$: C, 69.24; H, 7.84; Cl, 10.22; N, 8.08. Found: C, 69.66; H, 7.85; Cl, 10.08; N, 7.55.

EXAMPLE 13

*Preparation of 5-diethylamino-N-methyl-2,2-diphenylvaleramide and salts thereof*

A. ACIDS SULFATE OF 5-DIETHYLAMINO-2,2-DIPHENYLVALERIC ACID

A solution of 72 milliliters of concentrated sulfuric and 42 milliliters of water was added to 61.3 grams (0.2 mole) of 5-diethylamino-2,2-diphenylvaleronitrile, and the mixture was stirred and heated at 150 degrees centigrade for five hours. The viscous solution was poured onto cracked ice, and the resulting solid was recrystallized from an ether-isopropyl alcohol mixture. There was thus obtained 46 grams (54 percent yield) of the acid sulfate of 5-diethylamino-2,2-diphenylvaleric acid.

B. 5-DIETHYLAMINO-N-METHYL-2,2-DIPHENYLVALERAMIDE AND HYDROCHLORIDE THEREOF

Thionyl chloride (35 milliliters, 0.48 mole) was added with stirring to a slurry of 22 grams (0.051 mole) of the acid sulfate of 5-diethylamino-2,2-diphenylvaleric acid (Part A, this example). The mixture was stirred at room temperature for one-half hour and at about 55 degrees centigrade for fifteen minutes. Benzene and excess thionyl chloride were removed at fifty degrees centigrade under reduced pressure, and the residual acid sulfate of 5-diethylamino-2,2-diphenylvaleryl chloride was dissolved in 100 milliliters of benzene. The solution was cooled with an ice bath while a solution of twelve grams (0.36 mole) of methylamine in 100 milliliters of benzene was gradually added. The mixture was allowed to stand overnight at room temperature, heated under reflux for fifteen minutes, cooled, washed with water, and extracted with a solution of thirty milliliters of concentrated hydrochloric acid and 200 milliliters of water. The acid extract was made alkaline with 100 milliliters of twenty percent sodium hydroxide solution and extracted with benzene. The benzene extract was dried with anhydrous sodium sulfate and evaporated to dryness under reduced pressure, to obtain 5-diethylamino-N-methyl-2,2-diphenylvaleramide free base as an oil. This product was dissolved in ethyl acetate and a slight excess of hydrogen chloride-ethyl alcohol solution was added. Crystals were obtained which were recrystallized from ethyl alcohol-ethyl acetate mixture. There was thus obtained thirteen grams (seventy percent yield) of 5-diethylamino-N-methyl-2,2-diphenylvaleramide hydrochloride having a melting point of 178–180 degrees centigrade and the following analysis.

*Anal.*—Calcd. for $C_{22}H_{31}ClN_2O$: C, 70.47; H, 8.33; Cl, 9.46; N, 7.47. Found: C, 70.50; H, 8.43; Cl, 9.26; N, 6.97.

C. 5-DIETHYLAMINO-N-METHYL-2,2-DIPHENYLVALERAMIDE METHOBROMIDE

Four grams (0.0106 mole) of 5-diethylamino-N-methyl-2,2-diphenylvaleramide hydrochloride (Part B, this example) was converted to the corresponding free base by mixing the salt with twenty percent sodium hydroxide solution. The aqueous mixture was extracted with benzene; the benzene extract was dried with anhydrous sodium sulfate and evaporated to dryness under reduced pressure. The residual gummy 5-diethylamino-N-methyl-2,2-diphenylvaleramide was dissolved in fifty milliliters of methyl ethyl ketone, forty grams of methyl bromide was added, and the reaction mixture was kept in a stoppered flask at room temperature for 48 hours. There was obtained three grams (65 percent yield) of 5-diethylamino - N - methyl - 2,2 - diphenylvaleramide methobromide having a melting point of 190–192 degrees centigrade and the following analysis.

*Anal.*— Calcd. for $C_{23}H_{33}BrN_2O$: C, 63.73; H, 7.67; Br, 18.44; N, 6.46. Found: C, 63.95; H, 7.59; Br, 17.69; N, 7.06.

EXAMPLE 14

*Preparation of 4-dimethylamino-2,2-diphenylvaleranilide and hydrochloride thereof*

A. 4-DIMETHYLAMINO-2,2-DIPHENYLVALERANILIDE FREE BASE

Forty grams (0.1 mole) of the acid sulfate of 4-dimethylamino-2,2-diphenylvaleryl chloride (Example 1, Part B) was gradually added, with stirring, to a solution of 46 grams (0.5 mole) of aniline in 500 milliliters of benzene. The reaction mixture was poured into water and made alkaline. The desired product, 4-dimethylamino-2,2-diphenylvaleranilide, crystallized. After recrystallization from methyl alcohol it had a melting point of 169–171 degrees centigrade and the following analysis.

*Anal.*—Calcd. for $C_{25}H_{28}N_2O$: N, 7.52. Found: N, 6.86.

B. 4-DIMETHYLAMINO-2,2-DIPHENYLVALERANILIDE HYDROCHLORIDE

An ether solution of 4-dimethylamino-2,2-diphenylvaleranilide (Part A, this example) and an ethyl alcohol solution of hydrogen chloride were mixed to produce 4-dimethylamino - 2,2 - diphenylvaleranilide hydrochloride, which after recrystallization from an ethyl alcohol-isopropyl alcohol mixture had a melting point of 243–244.5 degrees centigrade.

EXAMPLE 15

*Preparation of l-4-dimethylamino-N-methyl-2,2-diphenylvaleramide and salts thereof*

A. ACID SULFATE OF l-4-DIMETHYLAMINO-2,2-DIPHENYLVALERIC ACID

The acid sulfate of l-4-dimethylamino-2,2-diphenylvaleric acid was prepared according to the procedure of Example 1, Part A, by replacing the racemic 4-dimethylamino-2,2-diphenylvaleronitrile employed therein with l-4-dimethylamino-2,2-diphenylvaleronitrile [Pohland et al., J. Am. Chem. Soc. 71, 461 (1949)].

B. ACID SULFATE OF l-4-DIMETHYLAMINO-2,2-DIPHENYLVALERYL CHLORIDE

The acid sulfate of l-4-dimethylamino-2,2-diphenylvaleryl chloride was prepared according to the procedure of Example 1, Part B, by replacing the acid sulfate of racemic 4-dimethylamino-2,2-diphenylvalerica acid employed therein with the acid sulfate of l-4-dimethylamino-2,2-diphenylvaleric acid (Part A, this example).

C. l-4-DIMETHYLAMINO-N-METHYL-2,2-DIPHENYLVALERAMIDE FREE BASE

A solution of twenty grams of methylamine in 100 milliliters of benzene was added dropwise to a stirred slurry of 36 grams of the acid sulfate of l-4-dimethylamino-2,2-diphenylvaleryl chloride (Part B, this example) and 200 milliliters of benzene. The reaction mixture was stirred for two hours at room temperature and then for one-half hour at reflux temperature. The mixture was washed with water and then extracted with 200 milliliters of ten percent hydrochloric acid, and the acid extract was made alkaline with 200 mililiters of twenty percent sodium hydroxide solution. l-4-dimethylamino-N-methyl - 2,2 - diphenylvaleramide precipitated as a solid. This compound, after recrystallization from dilute isopropyl alcohol, weighed 25.5 grams (94.5 percent yield) and had a melting point of 116–117 degrees centigrade, $[\alpha]_D^{22}$ minus 98 degrees (C = 1.4 in methyl alcohol), and the following analysis.

*Anal.*—Calcd. for $C_{20}H_{26}N_2O$: C, 77.38; H, 8.44; N, 9.03. Found: C, 77.78; H, 8.12; N, 9.06.

D. l-4-DIMETHYLAMINO-N-METHYL-2,2-DIPHENYLVALERAMIDE HYDROCHLORIDE

To a solution of ten grams of l-4-dimethylamino-N-methyl-2,2-diphenylvaleramide (Part C, this example) in 100 milliliters of ethyl acetate was added a slight excess of a solution of hydrogen chloride in ethyl alcohol. Eleven grams (98.5 percent yield) of l-4-dimethylamino-N-methyl-2,2-diphenylvaleramide hydrochloride precipitated; melting point 221–223 degrees centigrade, $[\alpha]_D^{22}$ minus 64 degrees (C = 0.7 in methyl alcohol). Analysis:

*Anal.*—Calcd. for $C_{20}H_{27}ClN_2O$: C, 69.24; H, 7.84; Cl, 10.22; N, 8.08. Found: C, 69.49; H, 7.71; Cl, 10.22; N, 7.87.

E. l-4-DIMETHYLAMINO-N-METHYL-2,2-DIPHENYLVALERAMIDE METHOBROMIDE

Ten grams of l-4-dimethylamino - N - methyl - 2,2-diphenylvaleramide (Part C, this example) was dissolved in 100 milliliters of methyl ethyl ketone, thirty grams of methyl bromide was added to the solution, and the stoppered mixture was allowed to stand at room temperature for 24 hours. The resulting crystalline product was recovered and dried. There was thus obtained a substantially quantitative yield of l-4-dimethylamino-2,2-diphenylvaleramide methobromide having a melting point of 181–182 degrees centigrade, $[\alpha]_D^{22}$ minus 29 degrees (C=1.0 in methyl alcohol), and the following analysis.

*Anal.*—Calcd. for $C_{21}H_{29}BrN_2O$: C, 62.22; H, 7.21; Br, 19.71; N, 6.91. Found: C, 62.21; H, 7.56; Br, 19.65; N, 6.43.

EXAMPLE 16

*Preparation of d-4-dimethylamino-N-methyl-2,2-diphenylvaleramide and salts thereof*

A. ACID SULFATE OF d-4-DIMETHYLAMINO-2,2-DIPHENYLVALERIC ACID

By following the procedure of Example 15, Part A, except for the substitution of d-4-dimethylamino-2,2-diphenylvaleronitrile (Pohland et al., supra) for the l-isomer thereof, there was obtained the acid sulfate of d-4-dimethylamino-2,2-diphenylvaleric acid.

B. ACID SULFATE OF d-4-DIMETHYLAMINO-2,2-DIPHENYLVALERYL CHLORIDE

By following the procedure of Example 15, Part B, except for the substitution of the acid sulfate of d-4-dimethylamino-2,2-diphenylvaleric acid (Part A, this example) for the l-isomer thereof, there was obtained the acid sulfate of d-4-dimethylamino - 2,2 - diphenylvaleryl chloride.

C. d-4-DIMETHYLAMINO-N-METHYL-2,2-DIPHENYLVALERAMIDE FREE BASE

By following the procedure of Example 15, Part C, except for the substitution of the acid sulfate of d-4-dimethylamino-2,2-diphenylvaleryl chloride (Part B, this example) for the l-isomer thereof, there was obtained an 89 percent yield of d-4-dimethylamino-N-methyl-2,2-diphenylvaleramide having a melting point of 114–116 degrees centigrade and $[\alpha]_D^{22}$ plus 97 degrees (C=0.9 in methyl alcohol).

D. d-4-DIMETHYLAMINO-N-METHYL-2,2-DIPHENYLVALERAMIDE HYDROCHLORIDE

By following the procedure of Example 15, Part D, except for the substitution of d-4-dimethylamino-N-methyl- 2,2-diphenylvaleramide (Part C, this example) for the *l*-isomer thereof, there was obtained *d*-4-dimethylamino-N-methyl-2,2-diphenylvaleramide hydrochloride. This compound had a melting point of 224–225 degrees centigrade, $[\alpha]_D^{22}$ plus 66 degrees (C=1.4 in methyl alcohol), and the following analysis.

*Anal.*—Calcd. for $C_{20}H_{27}ClN_2O$: C, 69.24; H, 7.84; Cl, 10.22. Found: C, 69.11; H, 7.63; Cl, 9.94.

E. *d*-4-DIMETHYLAMINO-N-METHYL-2,2-DIPHENYL-VALERAMIDE METHOBROMIDE

By following the procedure of Example 15, Part E, except for the substitution of *d*-4-dimethylamino-N-methyl-2,2-diphenylvaleramide (Part C, this example) for the *l*-isomer thereof, there was obtained *d*-4-dimethylamino-N-methyl-2,2-diphenylvaleramide methobromide having a melting point of 184–186 degrees centigrade, $[\alpha]_D^{22}$ plus 28 degrees (C=1.3 in methyl alcohol), and the following analysis.

*Anal.*—Calcd. for $C_{21}H_{29}BrN_2O$: C, 62.22; H, 7.21; Br, 19.71; N, 6.91. Found: C, 62.03; H, 6.89; Br, 19.68; N, 6.74.

EXAMPLE 17

*Preparation of 4-dimethylamino-N-(2-hydroxyethyl)-2,2-diphenylvaleramide and salts thereof*

A. 4-DIMETHYLAMINO-N-(2-HYDROXYETHYL)-2,2-DIPHENYLVALERAMIDE METHOBROMIDE

To a cooled solution of 161.9 grams (2.65 moles) of ethanolamine in 300 milliliters of benzene was gradually added, with stirring, 109.5 grams (0.265 mole) of the acid sulfate of 4-dimethylamino-2,2-diphenylvaleryl chloride (Example 1, Part B). Stirring was continued for several hours during which time the temperature of the reaction mixture was allowed to rise to about 25 degrees centigrade. The mixture stood overnight; water and chloroform were then added. The organic layer was separated, dried with anhydrous sodium sulfate, and the solution was concentrated to dryness. The residual 4-dimethylamino-N-(2-hydroxyethyl)-2,2-diphenylvaleramide was recrystallized twice from a mixture of cyclohexane and benzene. The purified product weighed 69.4 grams (77 percent yield) and had a melting point of 149.5–151.5 degrees centigrade and the following analysis.

*Anal.*—Calcd. for $C_{21}H_{28}N_2O_2$: C, 74.08; H, 8.29; N, 8.23. Found: C, 74.55; H, 8.27; N, 8.17.

B. 4-DIMETHYLAMINO-N-(2-HYDROXYETHYL)-2,2-DIPHENYLVALERAMIDE HYDROCHLORIDE

To a solution of ten grams (0.0295 mole) of 4-dimethylamino-N-(2-hydroxyethyl)-2,2-diphenylvaleramide (Part A, this example) in fifty milliliters of ethyl acetate was added a slight excess of an ethyl alcohol solution of hydrogen chloride. A solid precipitated but became oily on standing. By adding ten milliliters of ethyl alcohol to the mixture and heating on a steam bath for ten minutes, there was obtained 8.5 grams of crystalline 4-dimethylamino-N-(2-hydroxyethyl)-2,2-diphenylvaleramide hydrochloride having a melting point of 198–201 degrees centigrade and the following analysis.

*Anal.*—Calcd. for $C_{21}H_{29}ClN_2O_2$: C, 66.91; H, 7.75; Cl, 9.41; N, 7.43. Found: C, 66.59; H, 7.74; Cl, 9.38; N, 7.15.

C. 4-DIMETHYLAMINO-N-(2-HYDROXYETHYL)-2,2-DIPHENYLVALERAMIDE METHOBROMIDE

A stoppered reaction mixture consisting of ten grams (0.0295 mole) of 4-dimethylamino-N-(2-hydroxethyl)-2,2-diphenylvaleramide (Part A, this example), forty grams of methyl bromide, and 100 milliliters of methyl ethyl ketone was allowed to stand at room temperature for 24 hours. The resulting hard solid was separated from the supernatant liquid and then heated on a steam bath for about ten minutes with a mixture of forty milliliters of isopropyl alcohol and fifty milliliters of ethyl acetate. The 4-dimethylamino-N-(2-hydroxyethyl)-2,2-diphenylvaleramide methobromide thus obtained weighed twelve grams (94 percent yield) and had a melting point of 170–171 degrees centigrade and the following analysis.

*Anal.*—Calcd. for $C_{22}H_{31}BrN_2O_2$: C, 60.68; H, 7.18; Br, 18.36; N, 6.44. Found: C, 60.63; H, 7.00; Br, 18.19; N, 640.

EXAMPLE 18

*Preparation of 4-dimethylamino-N-methyl-2,2-diphenylvaleramide N-oxide and salts thereof*

Ten milliliters of thirty percent hydrogen peroxide was added to a suspension of 12.4 grams (0.04 mole) of 4-dimethylamino-N-methyl-2,2-diphenylvaleramide (Example 3, Part A) in 190 milliliters of methyl alcohol. The reaction mixture was shaken for sixteen hours during which all the solid material went into solution. The solution was allowed to stand at room temperature for four days and then an aqueous slurry of platinum-on-charcoal was added to decompose excess hydrogen peroxide. When oxygen evolution had subsided the mixture was shaken for six hours and then filtered, and the filtrate was evaporated to dryness below 55 degrees centigrade under reduced pressure. The crystalline residue was recrystallized from ethyl acetate. There was thus obtained 10.7 grams (82.5 percent yield) of 4-dimethylamino-N-methyl-2,2-diphenylvaleramide N-oxide (free base), melting point 144–146 degrees centigrade with decomposition. Analysis:

*Anal.*—Calcd. for $C_{20}H_{26}N_2O_2$: C, 73.75; H, 8.03; N, 8.58; O, 9.80. Found: C, 74.00; H, 8.12; N, 8.49; O, 9.86.

Samples of this product were converted to the hydrochloride and the hydrobromide, which were obtained as oils.

EXAMPLE 19

*Preparation of N,2,2-trimethyl-α-p-chlorophenyl-α-phenyl-1-pyrrolidinebutyramide free base*

To a slurry of 2.2 grams (0.056 mole) of sodium amide and 100 milliliters of dry toluene contained in a 500-milliliter, three-neck flask equipped with stirrer, reflux condenser, and addition funnel was added 18.6 grams (0.05 mole) of 2,2-dimethyl-α-p-chlorophenyl-α-phenyl-1-pyrrolidinebutyramide. The mixture was stirred and heated at reflux temperature for two hours and then cooled, whereupon a solution of 5.2 grams (0.055 mole) of methyl bromide in 25 milliliters of toluene was added and stirring was continued for one hour. The mixture was allowed to stand overnight and then a solution of thirty milliliters of concentrated hydrochloric acid in 100 milliliters of water was added. The aqueous phase was washed with ether and made alkaline with 120 milliliters of twenty percent sodium hydroxide solution. The resulting oil was extracted into benzene and the benzene solution was washed with saturated sodium chloride solution and then with water, dried with anhydrous sodium sulfate, and the benzene was removed by distillation under reduced pressure. The residual viscous oil was crystallized from pentane. The resulting solid was recrystallized from Skellysolve B to obtain five grams (26 percent yield) of N,2,2-trimethyl-α-p-chlorophenyl-α-phenyl-1-pyrrolidine butyramide having a melting point of 121–123 degrees centigrade.

*Anal.*—Calcd. for $C_{23}H_{29}ClN_2O$: C, 71.76; H, 7.59; Cl, 9.21; N, 7.28. Found: C, 71.57; H, 7.68; Cl, 9.09; N, 7.51.

EXAMPLE 20

*Preparation of 4-dimethylamino-N-(2-pyrrolidinoethyl)-2,2-diphenylvaleramide and dihydrochloride thereof*

Seventy grams (0.662 mole) of 2-pyrrolidinoethylamine in 200 milliliters of benzene was added gradually, with cooling, to 82.8 grams (0.2 mole) of the acid sulfate of 4-dimethylamino-2,2-diphenylvaleryl chloride (Example 1, Part B) in 200 milliliters of benzene in a twoliter, three-necked flask equipped with stirrer, reflux condenser, and dropping funnel. The reaction mixture was stirred at room temperature for six hours and at reflux temperatur for one-half hour, after which it was washed with water and extracted with a solution of fifty milliliters of concentrated hydrochloric acid in 200 milliliters of water. The acid extract was made alkaline with 200 milliliters of twenty percent sodium hydroxide solution. The resulting oil was extracted into benzene. This solution was dried with anhydrous sodium sulfate, and the benzene was removed by distillation under reduced pressure. 4 - dimethylamino-N-(2-pyrrolidinoethyl)-2,2-diphenylvaleramide free base was thus obtained as an oil. This oil was dissolved in ethyl acetate, and to the solution was aded sufficient of an ethyl alcohol-hydrogen chloride solution to form the dihydrochloride. Addition of ether caused precipitation of a gummy solid. By recrystallizing this solid from an alcohol-ether mixture, 4-dimethylamino-N-(2-pyrrolidinoethyl)-2,2-diphenylvaleramide dihydrochloride was obtained as a hygroscopic solid, melting point 133–136 degrees centigrade.

It will be understood that the compounds of this inveniton include racemic forms, as in Examples 1, 2, 3, 4, 5, 6, 11, 12, 14, 17, 18, 19, and 20, and optically active forms, as in Examples 15 and 16.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:
1. A compound having the formula:

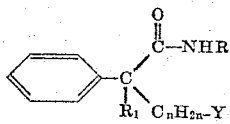

wherein $C_nH_{2n}$ is an alkylene group containing up to 6 carbon atoms, R is a radical containing up to 8 carbon atoms selected from the class consisting of alkyl, alkenyl, cycloalkyl containing 3 to 6 carbon atoms in the ring, methylcyclopentyl, dimethylcyclohexyl, aralkyl, phenyl, chloro-substituted phenyl, bromo-substituted phenyl, iodo-substituted phenyl, methyl-substituted phenyl, 2-hydroxyethyl, 2-pyrrolidinoethyl, $R_1$ is a radical containing up to 8 carbon atoms selected from the class consisting of phenyl, chloro-substituted phenyl, bromo-substituted phenyl, and iodo-substituted phenyl, and Y is selected from the class consisting of di-lower-alkylamino, pyrrolidino, morpholino, piperidino, 2-methylmorpholino, 2,2-dimethylpyrrolidino and 4-methylpiperidino.

2. A compound having the formula:

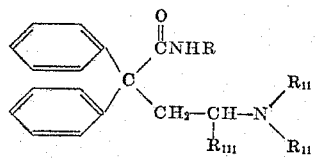

wherein R is an aliphatic hydrocarbon radical containing up to 8 carbon atoms and selected from the group consisting of alkyl and alkenyl, $R_{111}$ is an alkyl group containing up to 4 carbon atoms, and $R_{11}$ are alkyl radicals containing up to 8 carbon atoms which together with the tertiary nitrogen atom to which they are attached constitute a member selected from the group consisting of di-lower-alkylamino, pyrrolidino, morpholino, piperidino, 2-methylmorpholino, 2,2-dimethylpyrrolidino and 4-methylpiperidino.

3. A compound of the formula:

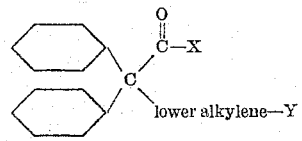

wherein X represents monolower-alkylamino and Y is dilower alkylamino and lower alkylene contains two carbons between the valences.

4. 4-dimethylamino-N-methyl - 2,2 - diphenylvaleramide hydrochloride.
5. N-allyl-4-dimethylamino-2,2-diphenylvaleramide.
6. N-cyclohexyl-4-dimethylamino - 2,2 - diphenylvaleramide hydrochloride.
7. N,2,2-trimethyl-α,α-diphenyl - 1 - pyrrolidinebutyramide hydrochloride.
8. 5-diethylamino-N-methyl - 2,2 - diphenylvaleramide.
9. d-4-dimethylamino-N-methyl - 2,2 - diphenylvaleramide hydrochloride.
10. 4-dimethylamino-N-(2-hydroxyethyl) - 2,2 - diphenylvaleramide.
11. 4-dimethylamino-N-methyl - 2,2 - diphenylvaleramide N-oxide.
12. 4-dimethylamino-N,3-dimethyl - 2,2 - diphenylbutyramide hydrochloride.

References Cited in the file of this patent
UNITED STATES PATENTS
2,647,926    Speeter _____ Aug. 4, 1953
FOREIGN PATENTS
504,085    Belgium _____ July 14, 1951
606,349    Germany _____ Nov. 30, 1934

OTHER REFERENCES
Jour. Pharmacol. and Exp. Therap., vol. 98, 1950, page 14.
Cheney et al.: Journal Org. Chem. vol., 17, pp. 770–776 (1952).
"Basic Amides as Antispasmodic Agents II," Wheatly et al., Jour. Org. Chem., vol. 19, pages 794–801, May 1954.

UNITED STATES PATENT OFFICE
CERTIFICATION OF CORRECTION

Patent No. 3,022,314

February 20, 1962

Brooke D. Aspergren et al.

It is hereby certified that error appears in the above numbered patent requiring correction and that the said Letters Patent should read as corrected below.

Column 2, PROCESS B, between lines 36 and 40, second structural formula on the right-hand side should appear as shown below instead of as in the patent:

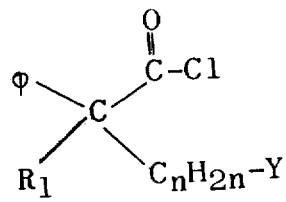

column 8, line 36, for "$C_{20}H_{27}ClN_2$:" read -- $C_{20}H_{27}ClN_2O$; --; lines 45 and 46, after "-diphenylvaleramide" insert -- methobromide, --; column 10, line 14, for "(0.5 mole)" read -- (0.05 mole) --; column 11, line 45, for "H, 8.80" read -- H, 8.08 --; column 13, lines 35 and 36, for "-pyrrolidone-butyramide" in italics, read -- -pyrrolidinebutyramide --, in italics; column 17, line 27, for "METHOBROMIDE" read -- FREE BASE --; column 18, line 5, for "N, 640" read -- N, 6.40 --.

Signed and sealed this 26th day of June 1962.

(SEAL)
Attest:

ERNEST W. SWIDER

Attesting Officer

DAVID L. LADD

Commissioner of Patents